US012170969B2

(12) United States Patent
Yu et al.

(10) Patent No.: US 12,170,969 B2
(45) Date of Patent: Dec. 17, 2024

(54) EARLY RELEASING UPLINK RETRANSMISSION MEMORY BASED UPON PREDICTION OF UPLINK RETRANSMISSION INDICATOR

(71) Applicant: Intel Corporation, Santa Clara, CA (US)

(72) Inventors: Zhibin Yu, Unterhaching (DE); Jianqiang Rao, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 17/428,280

(22) PCT Filed: Mar. 15, 2019

(86) PCT No.: PCT/EP2019/056608
§ 371 (c)(1),
(2) Date: Aug. 4, 2021

(87) PCT Pub. No.: WO2020/187393
PCT Pub. Date: Sep. 24, 2020

(65) Prior Publication Data
US 2022/0159589 A1    May 19, 2022

(51) Int. Cl.
*H04B 7/185*   (2006.01)
*H04L 1/1812*  (2023.01)
(Continued)

(52) U.S. Cl.
CPC .......... *H04W 52/48* (2013.01); *H04L 1/1812* (2013.01); *H04W 52/146* (2013.01); *H04W 52/241* (2013.01); *H04W 76/30* (2018.02)

(58) Field of Classification Search
CPC .. H04W 52/146; H04W 52/241; H04W 52/48
See application file for complete search history.

(56) References Cited

U.S. PATENT DOCUMENTS

2007/0149126 A1* 6/2007 Rangan ............... H04B 17/336
455/63.1
2008/0013499 A1* 1/2008 Ratasuk .............. H04W 52/223
370/338
(Continued)

FOREIGN PATENT DOCUMENTS

WO    2008008594 A2     1/2008
WO    2012095161 A1     7/2012
WO    WO-2020068973 A1 *  4/2020 ........... H04L 1/1819

OTHER PUBLICATIONS

International Search Report issued for International application No. PCT/EP2019/056608, mailed on Dec. 6, 2019, 3 p.p. (for informational purposes only).
(Continued)

*Primary Examiner* — Shantell L Heiber
(74) *Attorney, Agent, or Firm* — Viering, Jentschura & Partner mbB

(57) ABSTRACT

In accordance with various embodiments, an electron beam evaporator can comprise the following: a tubular target; an electron beam gun for producing at least one vapor source on a removal surface of the tubular target by means of an electron beam; wherein the removal surface is a ring-shaped axial end surface or a surface of the tubular target that extends conically or in a curved fashion from the free end edge.

20 Claims, 11 Drawing Sheets

(51) Int. Cl.
*H04W 52/14* (2009.01)
*H04W 52/24* (2009.01)
*H04W 52/48* (2009.01)
*H04W 76/30* (2018.01)

(56) References Cited

U.S. PATENT DOCUMENTS

| | | | | |
|---|---|---|---|---|
| 2010/0091801 | A1* | 4/2010 | Itakura | H04L 1/1854 |
| | | | | 370/475 |
| 2010/0322097 | A1* | 12/2010 | Jen | H04L 1/1854 |
| | | | | 370/252 |
| 2011/0242990 | A1* | 10/2011 | Simonsson | H04W 72/542 |
| | | | | 370/242 |
| 2012/0093114 | A1* | 4/2012 | Goto | H04B 7/061 |
| | | | | 370/329 |
| 2013/0051269 | A1* | 2/2013 | Suzuki | H04L 1/1822 |
| | | | | 370/252 |
| 2015/0358914 | A1* | 12/2015 | Song | H04L 5/14 |
| | | | | 370/280 |
| 2017/0013610 | A1* | 1/2017 | Lee | H04W 72/21 |
| 2019/0029052 | A1* | 1/2019 | Yang | H04L 25/0224 |
| 2019/0037598 | A1* | 1/2019 | Hamidi-Sepehr | H04W 72/21 |
| 2019/0215818 | A1* | 7/2019 | Takeda | H04W 28/04 |
| 2020/0336255 | A1* | 10/2020 | Wong | H04W 72/0446 |
| 2021/0168011 | A1* | 6/2021 | Davydov | H04L 1/0003 |

OTHER PUBLICATIONS

European office action issued for the corresponding EP patent application No. 19711592.6, dated Aug. 22, 2023, 5 pages (for informational purposes only).

* cited by examiner

EARLY RELEASING UPLINK RETRANSMISSION MEMORY BASED UPON PREDICTION OF UPLINK RETRANSMISSION INDICATOR

CROSS-REFERENCE TO RELATED APPLICATIONS

This is a national phase of PCT Application PCT/EP2019/056608, filed on Mar. 15, 2019, the entire contents of which are fully incorporated by reference herein.

FIELD

The disclosure relates to techniques of early releasing the uplink retransmission memory such as a HARQ (Hybrid Automatic Repeat Request) memory bank based upon a predicted value of an uplink (UL) retransmission indicator, e.g. an uplink ACK/NACK associated with a previously transmitted Physical Uplink Shared Channel (PUSCH).

BACKGROUND

In 4G LTE, UL transmission is based on synchronized UL HARQ process. Hereby, after User Equipment (UE) has transmitted an UL PUSCH, UE can guarantee to be able to receive UL ACK/NACK (Acknowledgement or Non-Acknowledgement) indication which is associated to the previous transmitted PUSCH within a predictable timing constraint (sub-frame n+4 for normal operation mode and sub-frame n+3 for latency reduction mode). In 5G NR (New Radio), however, in order to support ultra-flexible resource allocation in network side, unsynchronized HARQ process has been introduced for UL as shown in FIG. 1. For un-synchronized UL HARQ in 5G NR, after UE 110 has transmitted a UL PUSCH grant, UE cannot guarantee to be able to receive an associated UL ACK/NACK feedback within a predictable timing constraint (after $\Delta t$ from base station 120 as shown in FIG. 1).

The disclosure deals with the question how to overcome the drawbacks of 5G unsynchronized UL HARQ procedure to UE that within the UL payload buffer, the memory banks which store the previous transmitted UL-SCH packet can neither be early switched off for power saving nor be early released for other usages.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
5G NR: 3GPP fifth generation new radio specifications
QoS: Quality of Service
UL-SCH: uplink shared channel
UE: User Equipment
gNB: gNodeB, base station in 5G
LTE: Long Term Evolution
RF: Radio Frequency
UL: uplink
DL: downlink
SCH: shared channel
PDSCH: physical downlink shared channel
PUSCH: physical uplink shared channel
FR2: frequency range 2 according to 5G NR
HARQ: Hybrid Automatic Repeat Request
ACK: Acknowledge
NACK: Non-Acknowledge
NDI: new data indicator
DCI: downlink control information
TPC: transmit power control
MCS: modulation and coding scheme
CSI-RS: channel state information reference signal
SSB: synchronization signal block It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with radio cells such as access points, base stations, gNodeBs and/or eNodeBs. The described devices may include integrated circuits (ICs) and/or passives and may be manufactured according to various technologies. For example, the circuits may be designed as logic integrated circuits, ASICs, analog integrated circuits, mixed signal integrated circuits, optical circuits, memory circuits and/or integrated passives.

Figure 1:
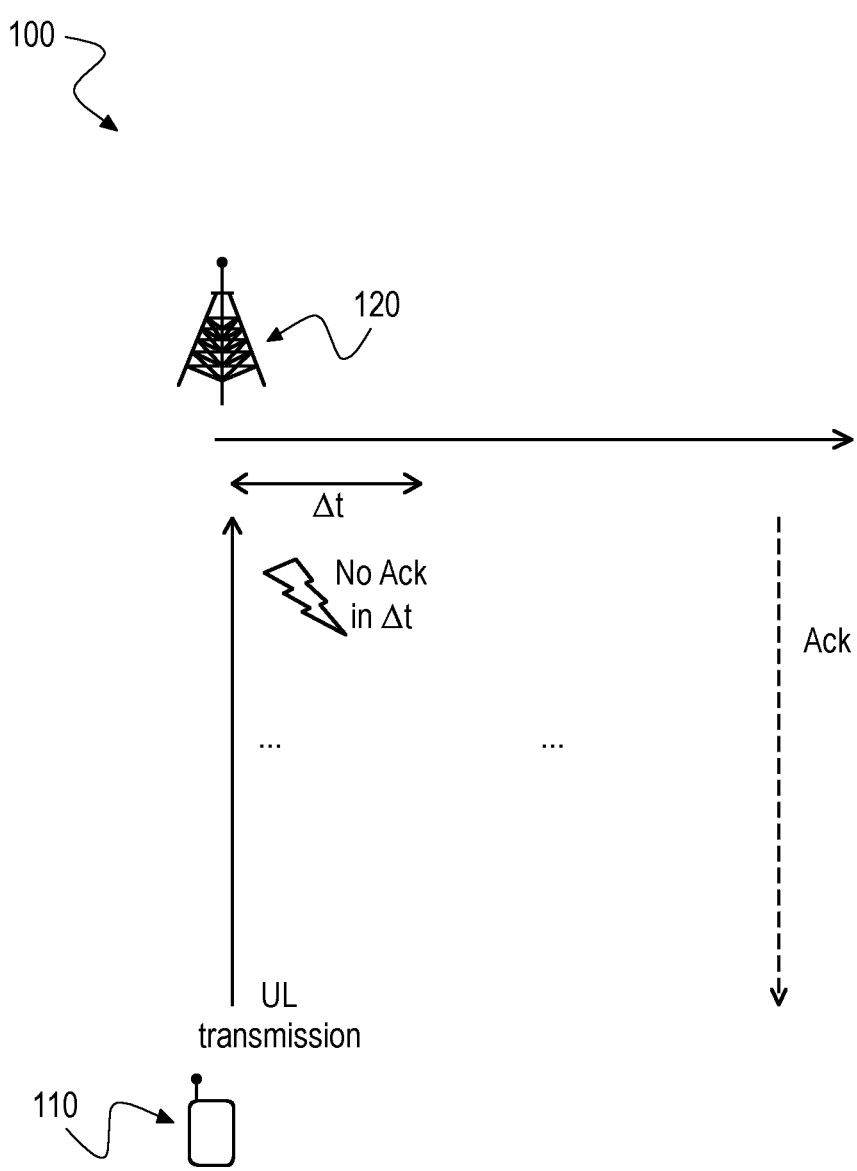
FIG. 1 is a schematic diagram of a communication system 100 illustrating UL HARQ transmission between a base station 120 and a user equipment (UE) 110.

FIG. 1 is a schematic diagram of a communication system 100 illustrating HARQ transmission between a base station 120 and a user equipment (UE) 110.

In 5G NR, in order to support ultra-flexible resource allocation in network side, unsynchronized HARQ process has been introduced for UL. For un-synchronized UL HARQ in 5G NR, after UE 110 has transmitted a UL PUSCH grant, UE cannot guarantee to be able to receive an associated UL ACK/NACK feedback from base station 120 within a predictable timing constraint Δt as shown in FIG. 1.

That is because, in 5G NR, the UL New Data Indicator (NDI), which is used to indicate a UL re-transmission for a previously transmitted PUSCH, is carried by DCI format 0, which is also used to indicate a new PUSCH grant. It means, in 5G NR, before receiving a new PUSCH grant, UE cannot release the UL-SCH packet in the payload buffer because these data might be required for UL retransmission at any future time. Depending on base station's internal scheduling, in bad conditions, UE could wait multiple seconds until an NDI for a previously transmitted PUSCH is indicated.

In the following, concepts are described how to overcome the drawbacks of 5G unsynchronized UL HARQ procedure to UE, i.e. that within the UL payload buffer, the memory banks which store the previous transmitted UL-SCH packet can neither be early switched off for power saving nor be early released for other usages.

The following example calculation for the single UL CC (component carrier) case illustrates the dimensions of resource allocation: Considering the maximal transport block size (TBS) per CC and considering that up to 16 UL HARQ process are performed in parallel, it results in up to 52*16=832 KByte of UL-SCH data which cannot be early released. This is quite inefficient for UE modem power saving because such memory banks which carries such huge payload bits cannot be early switched off or reused for other purposes.

A basic concept of this disclosure is that UE determines a prediction value by applying prediction of the PUSCH re-transmissions during unsynchronized UL HARQ operations in 5G NR. When UE predicts that a retransmission for a previous PUSCH is NONE (i.e., predicted value=0, for example), UE can either early release or switch off the memory banks which carry the already transmitted UL-SCH packet within the UL payload buffer. The PUSCH re-transmission prediction can be based on the following sub-methods, and they can work jointly:

(1) The PUSCH re-transmission prediction can be based on the statistics (i.e., predicted value=X, for example and X is compared to a threshold value) of previously received PUSCH re-transmission indexes (UL NDI in DCI format 0), further weighted by the MCS of the associated PUSCHs, within a historical sliding time window.

(2) The PUSCH re-transmission prediction can be jointly determined by the estimated gradient (i.e., predicted value=Y, for example and Y is compared to a threshold value) of the PUSCH transmission power values, during closed-loop PUSCH power control procedures, within a historical sliding time window: positive high valued gradient means the gNB is constantly sending TPC commands with positive power steps and asking for PUSCH transmission power boosting due to the poor received signal quality in gNB side. Such information implies that the UL channel is in poor conditions. And accordingly, the re-transmission likelihood of an upcoming UL PUSCH can increase, and vice versa.

(3) In particular, for 5G NR FR2 (mmWave bands) operation, where UL/DL beam correspondence is assumed (high channel reciprocal due to massive antenna elements (antenna array) based analog beamforming in both UE and gNB side), the prediction can also be jointly determined based on the beam quality measurements for the particular DL resources (CSI-RS/SSB) which are indicated to be spatially associated with the transmitted PUSCH beam.

(4) In particular, the PDSCH ACK bits which are carried by a target PUSCH may NOT be correctly decoded in the gNB side in the following scenario: The target PUSCH jointly carries DL HARQ feedback bits, when a UE transmits the PDSCH ACK bits but receives later on a DL PDSCH retransmission flag. Such information can be explored because it also implies poor UL channel qualities, and therefore the re-transmission likelihood for the target PUSCH can be increased.

In addition, since a wrong prediction can be detected in UE side by receiving in the future a true UL NDI from the network, the UE can also dynamically turn off the prediction to ensure the robustness of the overall system. For example, the UE can turn-off the prediction if the count of the wrong prediction exceeds a pre-defined threshold.

The advantages of such uplink retransmission prediction are early releasing/switching off the memory banks which carry the already transmitted UL-SCH packet (up to 52 KBytes per UL HARQ process) within the UL payload buffer, when PUSCH-transmission is predicted to be none. It results in reduced memory power reduction while it can still maintain UL link robustness for 5G NR unsynchronized UL HARQ scenarios.

Figure 2:
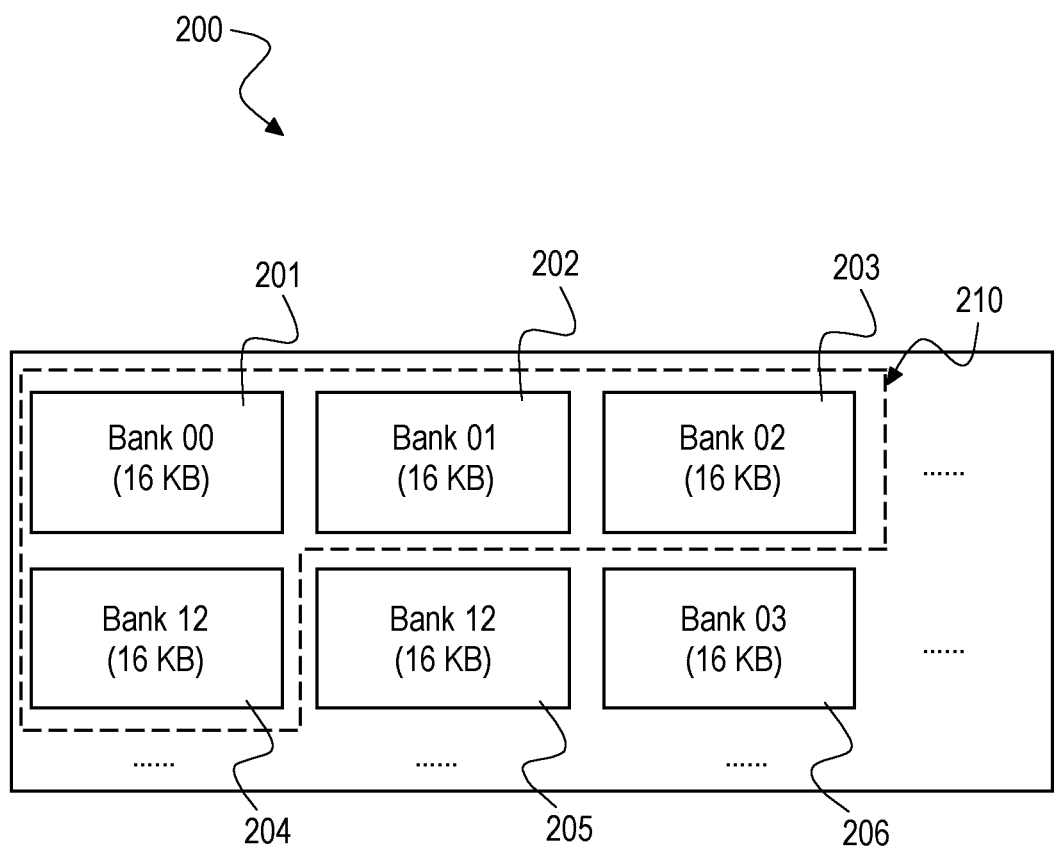
FIG. 2 is a schematic diagram illustrating an exemplary multi-bank uplink HARQ memory 200 for storing UL-SCH packets for PUSCH transmission according to the disclosure.

FIG. 2 is a schematic diagram illustrating an exemplary multi-bank uplink HARQ memory 200 for storing UL SCH packets for PUSCH transmission according to the disclosure.

The multi-bank uplink HARQ memory 200 is one example of an on-chip DRAM consisting of multiple memory banks 201, 202, 203, 204, 205, 206 with continuous addressing. In this example, each memory bank is 16 KB and each memory bank 201, 202, 203, 204, 205, 206 is in a different power domain. Each memory bank can be independently switched on and off. Clearly, UE power consumption can be reduced if the memory banks storing the UL retransmission payload can be earlier released and switched off. In an implementation, some of the memory banks, e.g. memory banks 201, 202, 203, 204 may be allocated to a first power domain 210 and other memory banks, e.g. memory banks 205, 206 may be allocated to a second power domain or to a second and third power domain. The power domains may be different and independently switchable.

During unsynchronized UL HARQ operations in 5G NR, in order to early release the memory banks which store an already transmitted UL-SCH packet (up to 52 kBytes per UL HARQ process), e.g. memory banks 201, 202, 203, 204 while still ensuring the UL link robustness for PUSCH transmission, UE can predict PUSCH re-transmissions. The four sub-methods (1), (2), (3) and (4) are listed above with respect to FIG. 1. These four sub-methods are further described below and they can work jointly.

Figure 3:
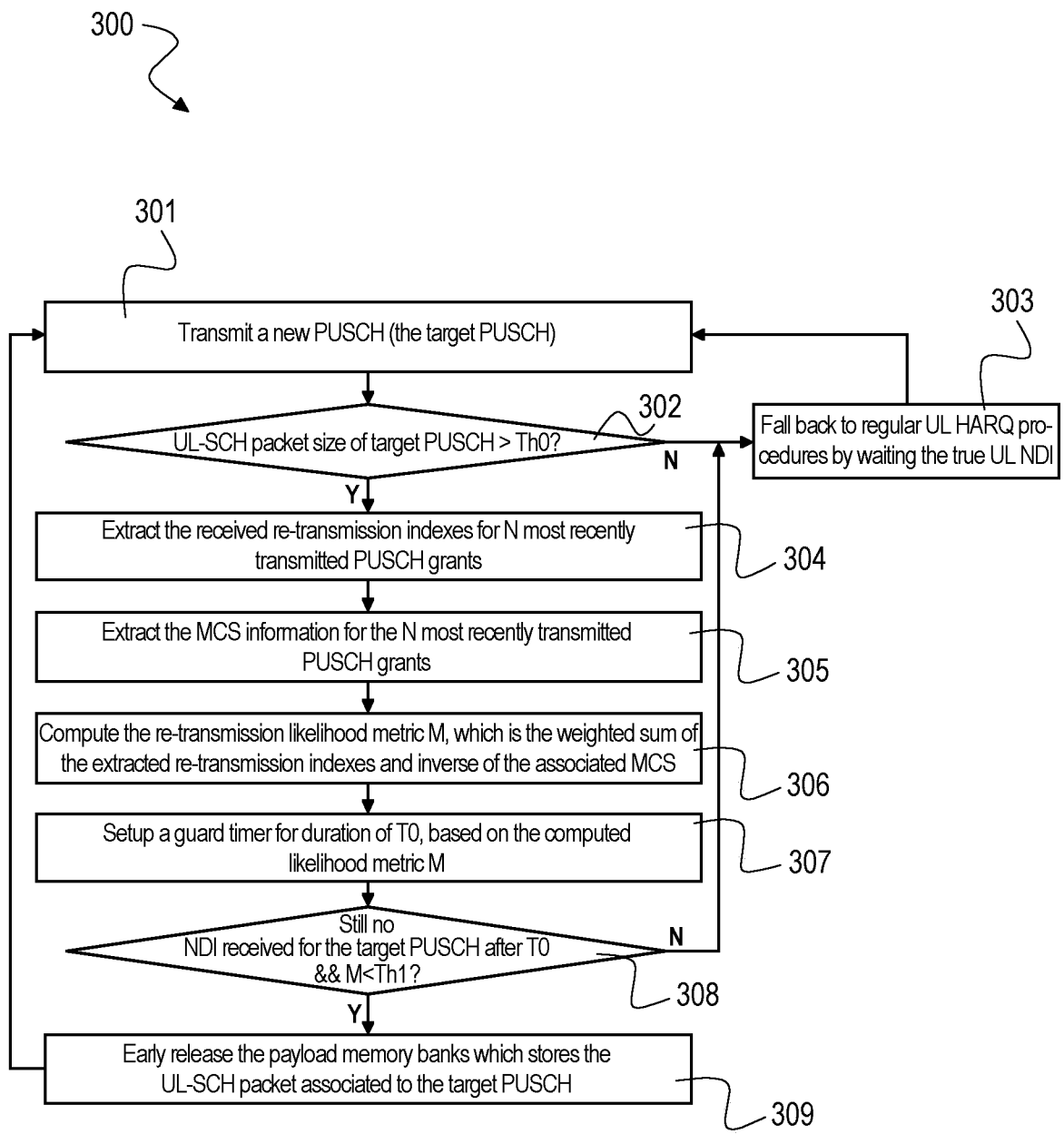
FIG. 3 is a schematic diagram illustrating an example procedure 300 of PUSCH re-transmission prediction by historical PUSCH retransmission statistics according to the disclosure.

FIG. 3 is a schematic diagram illustrating an example procedure 300 of PUSCH re-transmission prediction according to the disclosure.

The procedure or method 300 starts with transmitting 301 a new PUSCH (i.e. the target PUSCH). Then a check 302 is performed if UL-SCH packet size of the target PUSCH is greater than a threshold TH0. If no, the method 300 falls back 303 to regular UL HARQ procedures by waiting for the true UL NDI, i.e. the UL NDI transmitted by base station. If result of check 302 is yes, extracting 304 of received re-transmission indices for N most recently transmitted PUSCH grants is performed. Then, extracting 305 the MCS information for the N most recently transmitted PUSCH grants is performed. Computing 306 the retransmission likelihood metric M is performed, which is the weighted sum of the extracted re-transmission indices and inverse of the associated MCS. Then, guard timer is setup 307 for duration of T0 based on the computed likelihood metric M. Following this, a check 308 is performed if still no NDI is received for the target PUSCH after T0 and if M is less than a threshold Th1. If result of check 308 is no, method 300 jumps to block 303, i.e. the method 300 falls back 303 to regular UL HARQ procedures by waiting for the true UL NDI. Otherwise, if result of check 308 is yes, block 309 is performed, i.e. early release the payload memory banks which store the UL-SCH packet associated to the target PUSCH.

In FIG. 3, the first method (1) is illustrated in detail, where PUSCH re-transmission prediction can be based on statistics of historical received PUSCH re-transmission indices within a sliding time window.

In one example, UE can generate a re-transmission likelihood metric according to block 306 in FIG. 3 by counting the number of received re-transmission indices (for up to 4 PUSCH re-transmissions the index ranges from 0 to 3 while 0 means no re-transmission) for a fixed number of historical transmitted PUSCH. UE can then compare the metric with a pre-defined threshold to predict the re-transmission status for the target PUSCH. When it is predicted to be free of re-transmissions, UE can early release the memory banks or early switch it off before receiving the corresponding NDI.

For re-transmission likelihood metric generation (block 306), each historical retransmission count can be further weighted by the inverse of the modulation coding schemes (MCSs) of the associated PUSCH grants. That is because, a re-transmission associated to a wrongly decoded PUSCH with lower MCS indicates worse UL channel quality. Such information increases the re-transmission likelihood for the prediction.

Note that in FIG. 3, to ensure the system robustness, the decision for the prediction is NOT made immediately. Instead, a guard timer with the duration of T0 is set, in order to check whether an associated true NDI can still be received from the gNB within T0. T0 can be adapted to the computed re-transmission likelihood metric M: the higher of M, the shorter of T0.

In one example, the retransmission likelihood metric M (block 306 in FIG. 3) can be computed in the following form:

$$M = \sum_{i=1}^{N} \frac{G(i)}{MCS(i)+1} \text{ with } G(i) \in \{0, 1, 2, 3\} \text{ and } MCS(i) \in \{1, 2, \ldots, 28\}$$

where N is the number of the most recent PUSCH grants triggered by gNB (base station 120 according to FIG. 1). Example values for N can be 20. G(i) is the retransmission index value which is associated to the PUSCH grant i. Accordingly to 5G NR standard, it ranges from 0 to 3. In particular, G(i)=0 means the initial transmission while G(i)=3 means the 3rd retransmission. Clearly, the higher the value of G(i), the poorer the UL channel quality, which implies higher likelihood for UL retransmission for the target PUSCH. MCS(i) is the MCS (modulation coding scheme) index which is associated to the PUSCH grant i. MCS index can be selected by base station based on UL quality measurements in gNB receiver side and indicated to the UE in DCI (carried by PDCCH). According to 5G NR standard [38.214 Table 6.1.4.1-1] it ranges from 0 to 27. Clearly, when G(i)≠0, the lower the value of MCS(i), the poorer the UL channel quality it reflects, which implies higher likelihood for UL retransmission for the target PUSCH.

The following example values may be applied to the procedure shown in FIG. 3: Th0=32 kByte; T0 ranges from 1 ms to 10 ms. Th1=3; Note: Th1 can be further adapted to Quality of service (QoS) requirements of higher layer application scenarios. Quality of service is the description or measurement of the overall performance of a service, particularly the performance seen by the users of the network. To quantitatively measure quality of service, several related aspects of the network service are often considered, such as packet loss, bit rate, throughput, transmission delay, availability, jitter, etc. Quality of service comprises requirements on all the aspects of a connection, such as service response time, loss, signal-to-noise ratio, crosstalk, echo, interrupts, frequency response, loudness levels, and so on. For example, for reliability critical applications (e.g. safety messages or HD video conference streaming), Th1 can be set to a lower value (e.g. Th1=1), which prioritizes the UL transmission robustness. For example, for reliability less critical applications (e.g. FTP upload), Th1 can be set to a higher value (e.g. Th1=6), which prioritizes the UE power saving.

Figure 4:
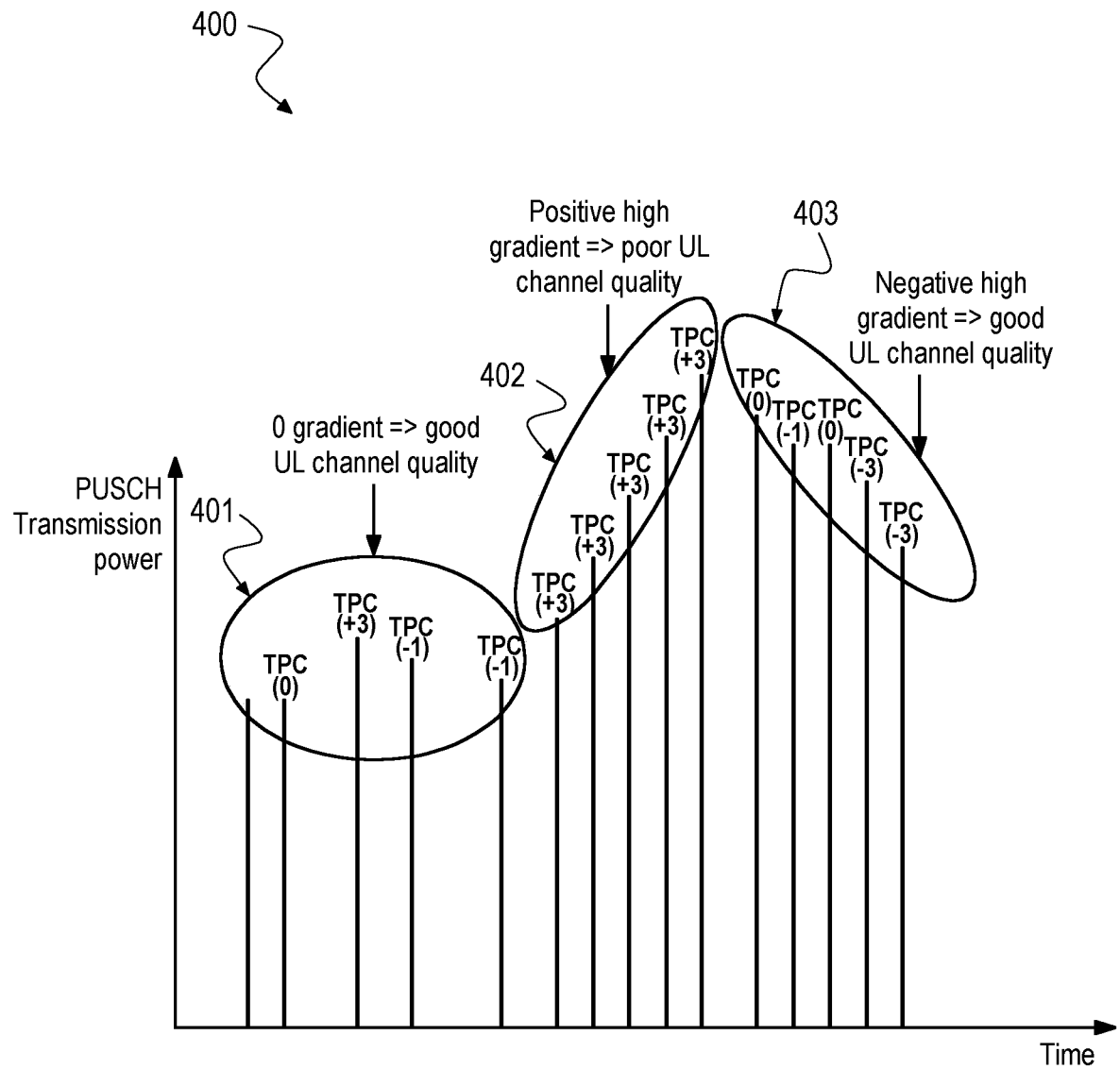
FIG. 4 is an exemplary power diagram 400 illustrating PUSCH re-transmission prediction by exploring gradient information of historical PUSCH transmission power values in closed-loop UL power control procedures according to the disclosure.

FIG. 4 is an exemplary power diagram 400 illustrating PUSCH re-transmission prediction by exploring gradient information of historical PUSCH transmission power values in closed-loop UL power control procedures according to the disclosure. FIG. 4 shows PUSCH transmission power for three gradient groups 401, 402, 403 of TPC commands. In the first gradient group 401 gradient is about zero which indicates good UL channel quality. In the second gradient group 402 gradient is positive high (i.e. rising) which indicates poor UL channel quality. In the third gradient group 403 gradient is negative high (i.e. falling) which indicates good UL channel quality.

In FIG. 4, the second method (2) is illustrated in detail, where PUSCH re-transmission prediction can be jointly determined by gradient estimation of the PUSCH transmission power values, which are controlled by TPC commands received from gNB, within a historical sliding time window.

In closed-loop UL power control procedures, based on the received UL signal quality measurement, gNB would iteratively send TPC commands to UE to increase or decrease the PUSCH transmission power. When UE constantly receives PUSCH TPC commands with positive power steps, as shown in FIG. 4 (group 402), it implies that the UL channel quality is poor. Such information can be explored to up-bias the PUSCH re-transmission likelihood metric.

In the second method as illustrated here, the PUSCH transmission power gradient may be computed within a sliding time window, the power values can also be smooth filtered before the gradient is estimated. FIG. 4 shown an example procedure of gradient estimation.

Figure 5:
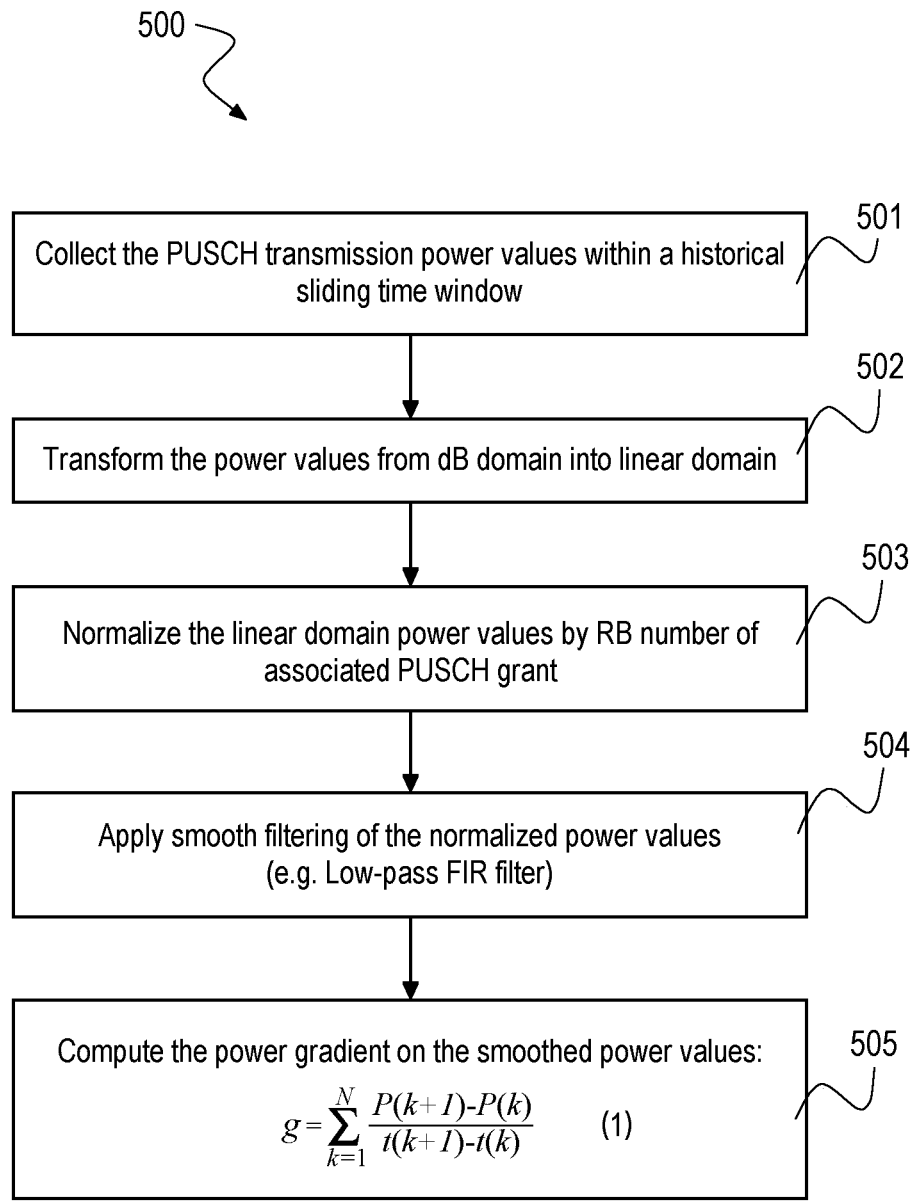
FIG. 5 is a schematic diagram illustrating an example procedure 500 for PUSCH transmission power gradient computation according to the disclosure.

FIG. 5 is a schematic diagram illustrating an example procedure 500 for PUSCH transmission power gradient computation according to the disclosure.

The procedure 500 starts with a first block 501: collecting the PUSCH transmission power values within a historical (i.e. previous) sliding time window. Then a second block 502: transforming the power values from dB domain into linear domain. After that a third block 503: normalizing the linear domain power values by RB (resource block) number of associated PUSCH grant. It follows a fourth block 504: applying smooth filtering of the normalized power values (e.g. by low-pass FIR filter). Then a fifth block 505: computing the power gradient on the smoothed power values according to formula (1):

$$g = \sum_{k=1}^{N} \frac{P(k+1) - P(k)}{t(k+1) - t(k)} \quad (1)$$

Note that in formula (1), P(k) is the PUSCH transmission power value at time instance t(k), which has already transformed from dB domain into the linear domain, normalized by the resource block number of the associated PUSCH, and further smooth filtered.

Figure 6:
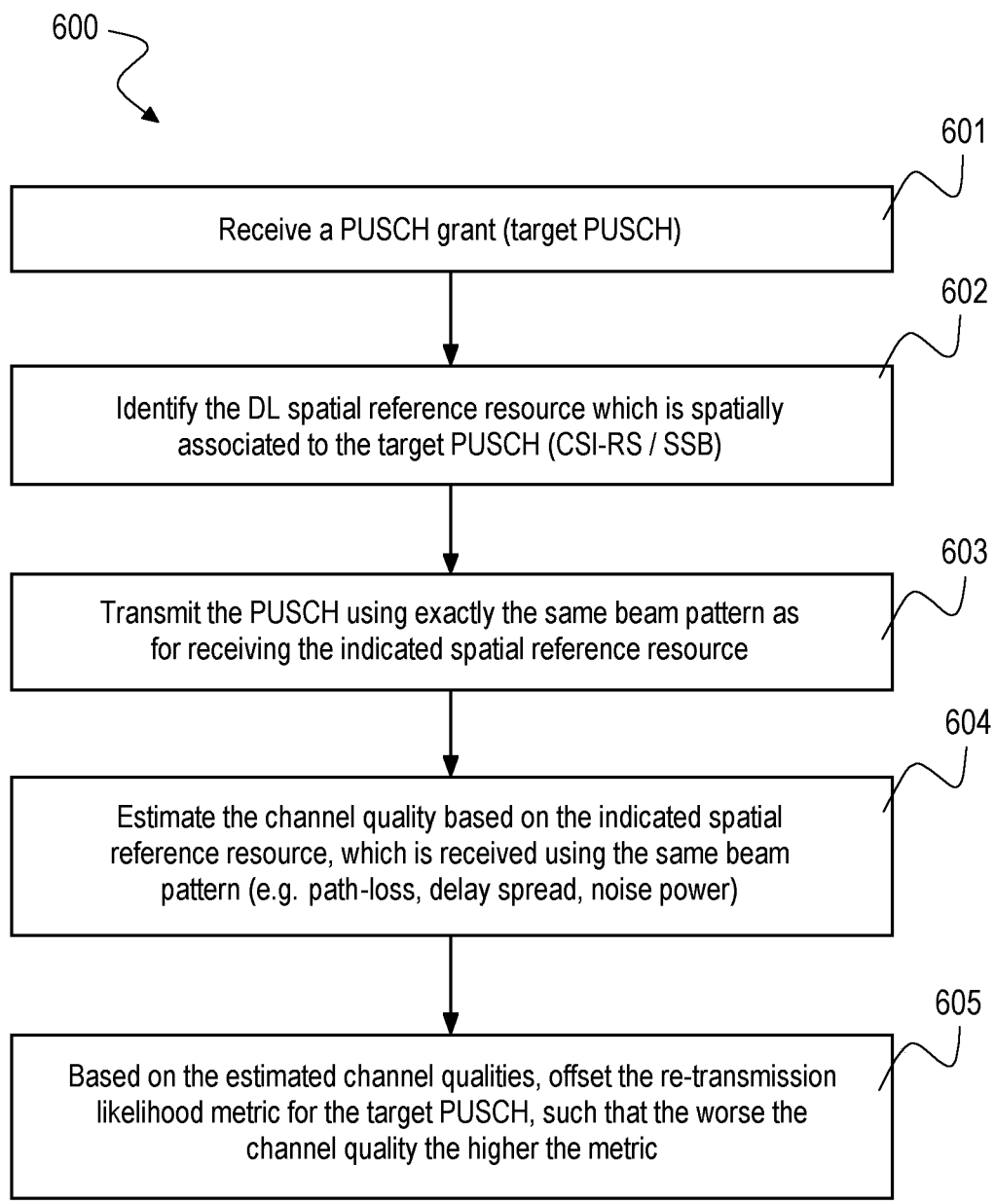
FIG. 6 is a schematic diagram illustrating an example procedure 600 for PUSCH re-transmission prediction by exploring high channel reciprocal in 5G NR FR2 operations according to the disclosure.

FIG. 6 is a schematic diagram illustrating an example procedure 600 for PUSCH re-transmission prediction by exploring high channel reciprocal in 5G NR FR2 operations according to the disclosure.

The procedure 600 starts with a first block 601: receiving a PUSCH grant (target PUSCH). Then a second block 602: identifying the DL spatial reference resource index which is spatially associated to the target PUSCH (CSI-RS index or SSB index). It follows a third block 603: transmitting the PUSCH using exactly the same beam pattern as for receiving the indicated spatial reference resource. After that, a fourth block 604: extimating the channel quality based on the indicated spatial reference resource signals, which are received by the UE using the same beam pattern (e.g. path-loss, delay spread, noise power). Then a fifth block 605 follows: based on the estimated channel qualities, UE determines the re-transmission likelihood metric for the target PUSCH, such that the worse the channel quality the higher the metric.

In FIG. 6, the third method (3) is illustrated in detail. Particularly for 5G NR FR2 (frequency range 2, mmWave bands), where high channel reciprocal is achieved due to narrow beamforming by massive antenna elements, PUSCH re-transmission prediction can be jointly determined by DL channel quality measurements for the particular DL reference signals which are indicated to be spatially associated to the target PUSCH.

According to 3GPP 5G NR uplink beam management framework for FR2 operation, when beam correspondence capability is reported from UE to gNB, gNB can dynamically indicate a DL spatial reference resource (a SSB or a CSI-RS resource) which is spatially associated to a PUSCH grant. Accordingly, UE must generate exactly the same beam pattern for transmitting the associated PUSCH, as for receiving the indicated DL spatial reference resource. The procedure results in high channel reciprocal. The PUSCH re-transmission likelihood metric can also be jointly determined based on the DL quality measurements for such particular DL resource (SSB or CSI-RS), which is indicated to be spatially associated to the target PUSCH. For example, the measured channel quality metric from such DL spatial reference resource can be: 1) path-loss estimation; 2) delay spread estimation; or 3) noise power estimation. By considering high channel reciprocal in FR2, they reflect the signal attenuation level, signal reflections level and noise level also for the UL beam, in which the associated PUSCH is transmitted. The detailed procedure is shown in FIG. 6.

Figure 7:
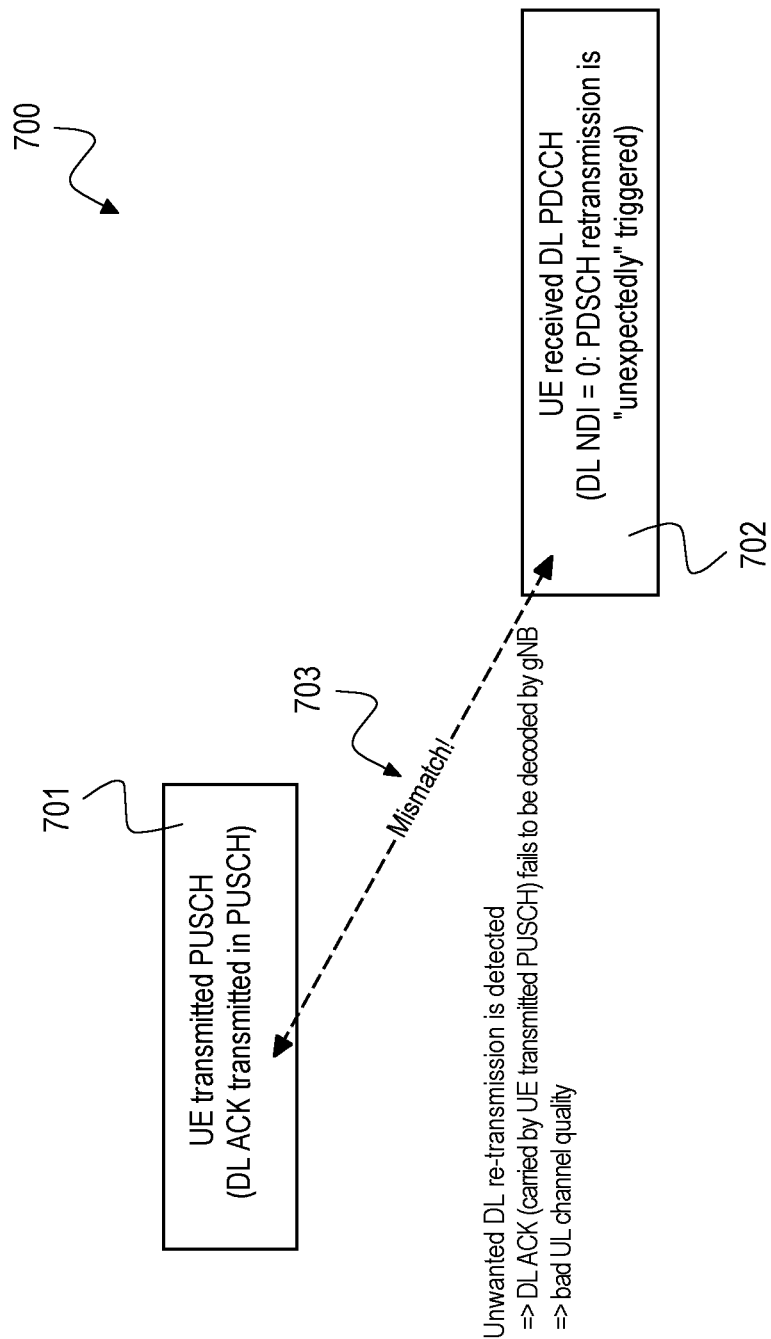
FIG. 7 is a schematic diagram illustrating an example of unwanted DL re-transmission detection 700 according to the disclosure.

FIG. 7 is a schematic diagram illustrating an example of unwanted DL re-transmission detection 700 according to the disclosure.

In a first block 701, UE transmitted UL PUSCH, which carries the DL ACK bits associated to a DL HARQ process. In a second block 702, UE received a DL PDCCH which indicates a DL retransmission which is associated to a same DL HARQ process (NDI field within DCI is 0). There is a mismatch 703 between first block 701 and second block 702: Unwanted DL retransmission is detected. That is because the DL retransmission in block 702 is contradicting with the previously indicated DL ACK bits carried by PUSCH in block 701, which means the indicated DL ACK bits (carried by UE transmitted PUSCH) fail to be decoded by gNB. This further implies bad UL channel quality.

In FIG. 7, the fourth method (4) is illustrated in detail. In particular, for a transmitted PUSCH which jointly carries DL PDSCH ACK bits, the PUSCH re-transmission can be jointly determined by later-on detecting the unwanted DL re-transmission which is associated to the ACK bits carried by the same PUSCH.

DL PDSCH ACK/NACK bits need to be sent from UE to the gNB for DL HARQ processes. They can be carried by PUSCH or PUCCH. If it is decoded to be NACK in gNB side, a DL PDSCH re-transmission flag can be later-on indicated to UE (it is in different DCI formats than UL re-transmission indicators). When UE has successfully decoded a previous DL PDSCH and when the associated DL ACK bits are carried by a target PUSCH, for poor UL channels, the network may fail decoding the DL ACK bits in the received PUSCH and may schedule an unwanted DL re-transmission to the UE. UE can detect that because it remembers the previous DL PDSCH decoding status. When UE has detected unwanted DL re-transmission, the target PUSCH which used to carry the related ACK bits can be assumed in poor UL channel qualities. Such information can be explored to modify the re-transmission likelihood for that target PUSCH. One example procedure of this unwanted DL re-transmission detection 700 is shown in FIG. 8.

Figure 8:
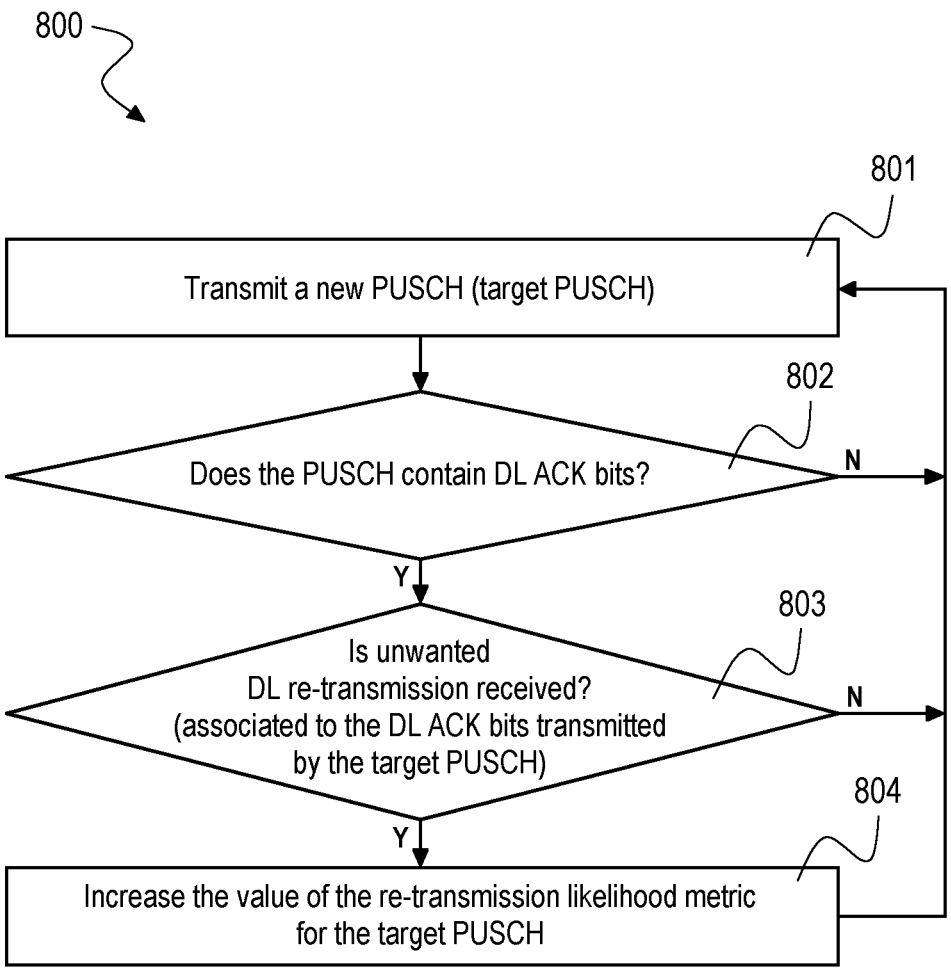
FIG. 8 is a schematic diagram illustrating an example procedure 800 for PUSCH re-transmission prediction by detecting unwanted DL re-transmissions associated to the ACK bits transmitted by the target PUSCH according to the disclosure.

FIG. 8 is a schematic diagram illustrating an example procedure 800 for PUSCH re-transmission prediction by detecting unwanted DL re-transmissions associated to the DL ACK bits transmitted by the target PUSCH according to the disclosure.

In a first block 801, a new PUSCH (target PUSCH) is transmitted. Then a check 802 is performed if the PUSCH contains DL ACK bits. If result is no, the procedure jumps back to first block 801. If result is yes, a further check 803 is performed if unwanted DL retransmission is received (associated to the DL ACK bits transmitted by the target PUSCH). If result is no, the procedure jumps back to first block 801. If result is yes, in a fourth block 804, the value of re-transmission likelihood metric for the target PUSCH is increased.

The four methods described above with respect to FIGS. 1 to 8 can be used to predict the PUSCH re-transmission either standalone or in a joint manner. For the joint operation, as for one example, the PUSCH re-transmission likelihood metrics from each method can each be weighted by a different weighting coefficient, and then linearly combined to generate a combined re-transmission likelihood metric for a target PUSCH grant. The combined retransmission likelihood metric can be compared with a pre-defined threshold: when higher than the threshold, it means PUSCH re-transmission is predicted to be TRUE and accordingly the target PUSCH UL payload bits need to be still maintained within the UL HARQ buffer; Otherwise, the PUSCH re-transmission is predicted to be FALSE and accordingly the HARQ memory banks containing the target UL payload bits can be earlier released for other usages or switched off. One example is shown in FIG. 9 below.

Figure 9:
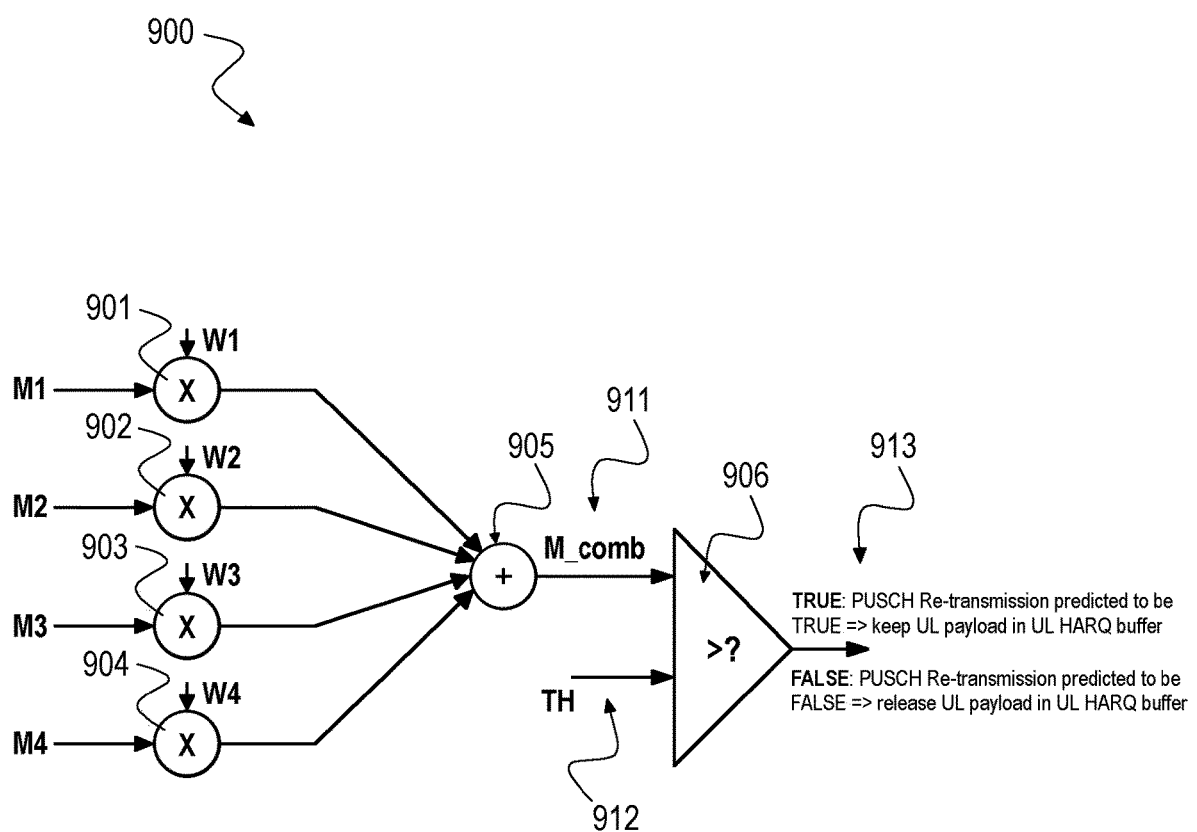
FIG. 9 is a schematic diagram illustrating an example of linear weighted combining of four methods for jointly PUSCH re-transmission prediction 900 according to the disclosure.

FIG. 9 is a schematic diagram illustrating an example of linear weighted combining of four methods for jointly PUSCH re-transmission prediction 900 according to the disclosure.

A first metric M1 derived by method (1) as described above with respect to FIGS. 1 to 8 is weighted 901 by a first weight W1. A second metric M2 derived by method (2) as described above with respect to FIGS. 1 to 8 is weighted 902 by a second weight W2. A third metric M3 derived by method (3) as described above with respect to FIGS. 1 to 8 is weighted 903 by a third weight W3. A fourth metric M4 derived by method (4) as described above with respect to FIGS. 1 to 8 is weighted 904 by a fourth weight W4. All four weighted metrics are combined (e.g. added) by combiner 905 (e.g. adder 905) to a combined metric M_comb 911. A comparator 906 compares this combined metric M_comb 911 with a threshold TH, 912. Result 913 of comparator 906 is TRUE if PUSCH re-transmission is predicted to be TRUE; then, UL payload can be kept in the UL HARQ buffer. Result 913 of comparator 906 is FALSE if PUSCH retransmission is predicted to be FALSE; then, UL payload can be released from the UL HARQ buffer.

Since a wrong prediction can be detected in UE side by later-on receiving in the future a true NDI from the network, UE can also dynamically turn off the prediction if the count of the wrong prediction exceeds a pre-defined threshold, which ensures the robustness of the overall system. Note that the PUSCH re-transmission prediction can be verified by comparing with the prediction decision with a later-on received UL NDI from the base station, which is associated to a same PUSCH grant.

The threshold 912 (TH in FIG. 9) can also be dynamically adapted to reliability requirements (e.g. quality requirements) of higher layer applications. As for example, for reliability high critical applications (e.g. safety messages transmission or HD video conference streaming), TH can be set at a lower value, which prioritizes for UL transmission robustness. In another example, for reliability less critical applications (e.g. FTP upload), TH can be set at a higher value, which prioritizes for UE power saving.

Figure 10:
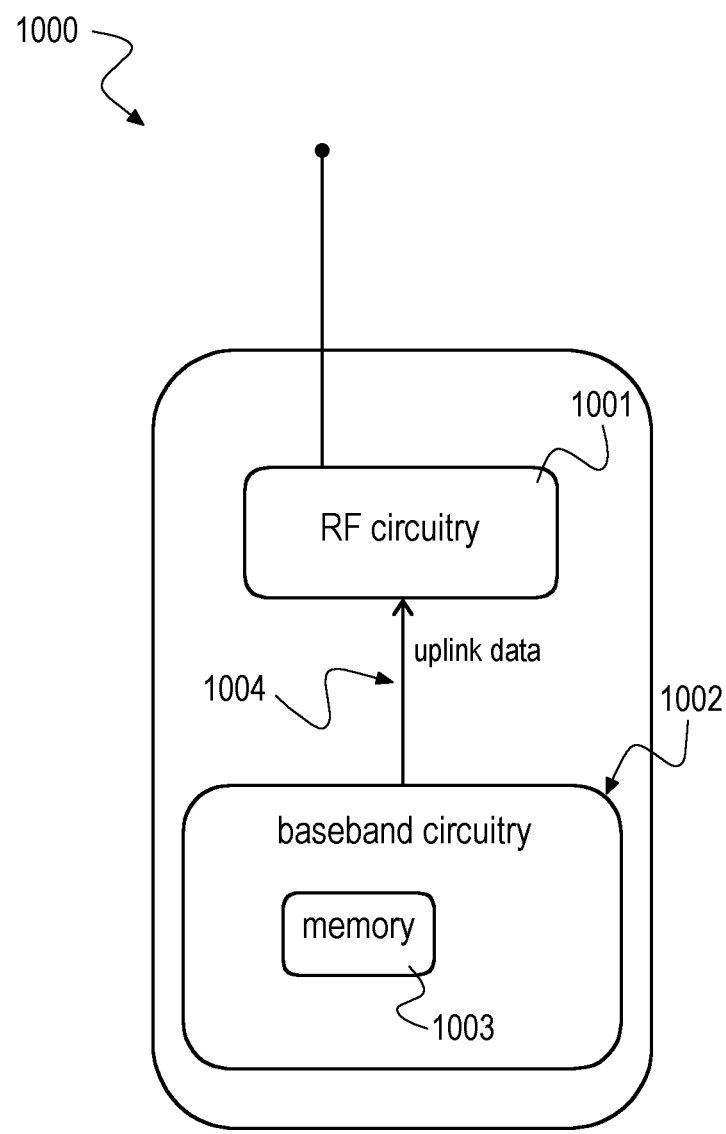
FIG. 10 is a block diagram illustrating a UE circuitry 1000 according to the disclosure.

FIG. 10 is a block diagram illustrating a UE circuitry 1000 according to the disclosure.

The UE circuitry 1000 comprises a Radio Frequency (RF) circuitry 1001, configured to transmit uplink data 1004; an uplink retransmission memory 1003 configured to store the transmitted uplink data 1004 for a later retransmission; and a baseband circuitry 1002. The baseband circuitry 1002 is configured to release the uplink retransmission memory 1003 based upon a predicted value of an uplink retransmission indicator before receiving the uplink retransmission indicator from a base station. The uplink retransmission indicator indicates a successful transmission of the uplink data 1004 stored in the uplink retransmission memory 1003. The UE circuitry 1000 can be implemented in a UE 110 as shown in FIG. 1. The uplink retransmission indicator can be received from a base station 120 as shown in the scenario of FIG. 1. The uplink retransmission memory 1003 may include a memory configuration 200 as shown in FIG. 2. Prediction of the uplink retransmission indicator may be performed as described above with respect to FIGS. 2 to 9. The uplink retransmission memory 1003 may be an online memory of the baseband circuitry 1002 or may be implemented as external memory.

In particular, the uplink retransmission indicator may be predicted based on statistics of previously received uplink retransmission indices. These statistics may be based on an uplink retransmission index which indicates a number of retransmissions of the same uplink data, e.g. as described above for method (1) with respect to FIG. 3.

The uplink retransmission indicator may be predicted based on statistics of previously received uplink retransmission indices weighted by a modulation and coding scheme (MCS) of uplink data associated with the respective uplink retransmission indices, e.g. as described above for method (1) with respect to FIG. 3.

The uplink retransmission indicator may be predicted based on gradient measurement for uplink transmission power changes determined for previously received uplink transmission power control (TPC) commands, e.g. as described above for method (2) with respect to FIGS. 4 and 5. The baseband circuitry 1002 may release the uplink retransmission memory 1003 for a gradient measurement indicating a negative gradient and to maintain the uplink retransmission memory 1003 for a gradient measurement indicating a positive gradient.

The uplink retransmission indicator may be predicted based on downlink channel quality measurements for particular downlink reference signals that are indicated to be spatially associated to the transmitted uplink data 1004, e.g. as described above for method (3) with respect to FIG. 6. The baseband circuitry 1002 may determine the downlink channel quality measurements based on at least one of the following: path-loss estimation, delay spread estimation or noise power estimation of the particular downlink reference signals, e.g. as described above for method (3) with respect to FIG. 6.

The baseband circuitry 1002 may predict the uplink retransmission indicator by comparing between downlink acknowledge bits (DL ACK) carried by the uplink data transmission (PUSCH), and a later-on received downlink re-transmission which is violating the indicated downlink acknowledge bits, e.g. as described above for method (4) with respect to FIGS. 7 and 8.

The baseband circuitry 1002 may release the uplink retransmission memory 1003 based on a metric, e.g. as described above with respect to FIG. 9. The metric 911 is weighting at least one of the following information: statistics of previously received uplink retransmission indices, e.g. as described above for method (1) with respect to FIG. 3, gradient information determined for previously received uplink transmission power control (TPC) commands, e.g. as described above for method (2) with respect to FIGS. 4 and 5, downlink channel quality measurements for particular downlink reference signals that are indicated to be spatially associated to the transmitted uplink data, e.g. as described above for method (3) with respect to FIG. 6, and a downlink retransmission indicator indicating a successful transmission of downlink data, e.g. as described above for method (4) with respect to FIGS. 7 and 8.

The baseband circuitry 1002 is configured to release the uplink retransmission memory 1003 when the metric 911 is below a threshold 912 and to maintain the uplink retransmission memory 1003 when the metric 911 is above the threshold 912.

The baseband circuitry 1002 may adapt the threshold 912 based on Quality of Service, QoS, requirements of higher layer applications. In particular, the baseband circuitry 1002 may reduce the threshold 912 for a QoS critical application if the QoS requirement is reduced.

The baseband circuitry 1002 may turn-off the prediction of the uplink retransmission indicator upon detecting a threshold number of wrong prediction results. In particular, the baseband circuitry 1002 may determine a wrong prediction result based on a comparison between the uplink retransmission indicator predicted by the UE circuitry 1000 and the uplink retransmission indicator received later-on from a base station 120 (see FIG. 1) which is associated to the same transmitted uplink data 1004.

The uplink retransmission memory 1003 may comprises a plurality of memory banks, e.g. as described above with respect to FIG. 2. Each memory bank may be in an independent power domain and may be individually powered off if the stored uplink retransmission data 1004 is released within a memory bank.

The baseband circuitry 1002 may process a plurality of unsynchronized Hybrid Automatic Repeat Request (HARQ) processes according to 5G New Radio specification, e.g. as described above with respect to FIGS. 1 and 2.

Figure 11:
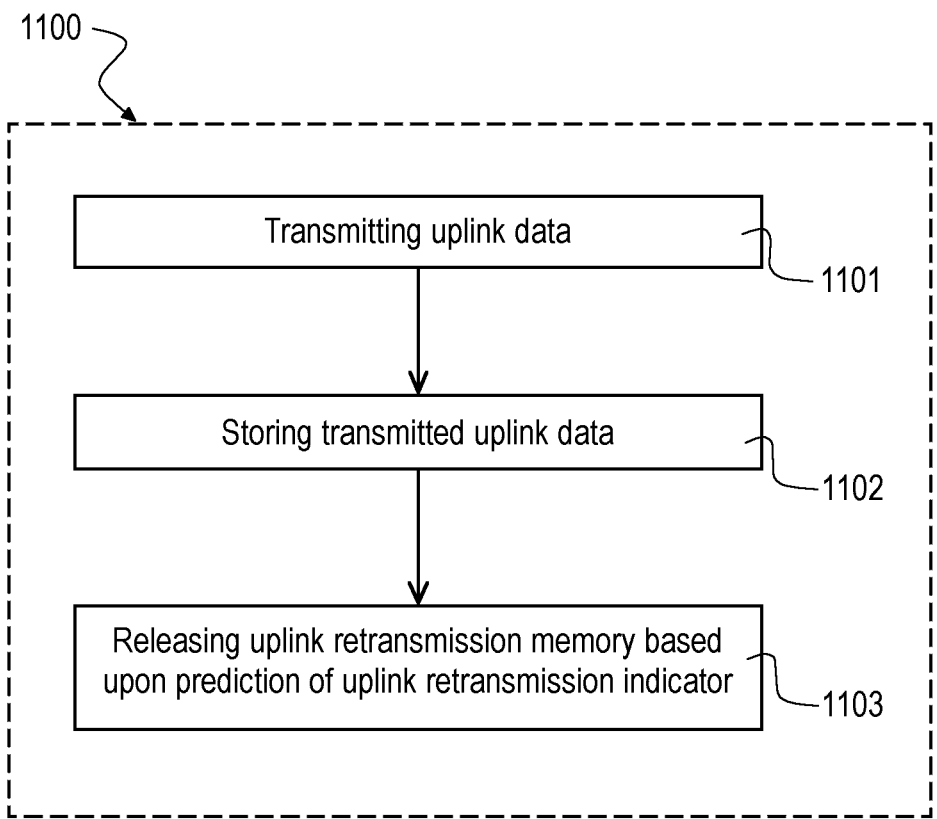
FIG. 11 is a schematic diagram illustrating an exemplary method 1100 for unsynchronized uplink transmission according to the disclosure.

FIG. 11 is a schematic diagram illustrating an exemplary method 1100 for unsynchronized uplink transmission according to the disclosure.

The method 1100 comprises transmitting 1101 uplink data, e.g. uplink data 1004 as described with respect to FIG. 10. The method 1100 comprises storing 1102 the transmitted uplink data 1004 in an uplink retransmission memory for a later retransmission, e.g. a memory 1003 as described with respect to FIG. 10. The method 1100 comprises releasing 1103 the uplink retransmission memory 1003 based upon a predicted value of an uplink retransmission indicator before receiving the uplink retransmission indicator from a base station, the uplink retransmission indicator indicating a successful transmission of the uplink data stored in the uplink retransmission memory. The prediction of the uplink retransmission indicator may be performed as described above with respect to FIGS. 2 to 10.

The method 1100 may comprise: predicting the uplink retransmission indicator based on statistics of previously received uplink retransmission indices. The method 1100 may comprise: determining the statistics of previously received uplink retransmission indices based on an uplink retransmission index which indicates a number of retransmissions of the same uplink data.

The method 1100 may comprise: releasing the uplink retransmission memory based on a metric weighting at least one of the following information: statistics of previously received uplink retransmission indices, e.g. as described above for method (1) with respect to FIG. 3, gradient information determined for previously received uplink transmission power control (TPC) commands, e.g. as described above for method (2) with respect to FIGS. 4 and 5, downlink channel quality measurements for particular downlink reference signals that are indicated to be spatially associated to the transmitted uplink data, e.g. as described above for method (3) with respect to FIG. 6, and a downlink retransmission indicator indicating a successful transmission of downlink data, e.g. as described above for method (4) with respect to FIGS. 7 and 8.

The present disclosure also supports a computer program product including computer executable code or computer executable instructions that, when executed, causes at least one computer to execute the performing and computing blocks described herein and the methods and procedures described above. Such a computer program product may include a non-transient readable storage medium storing program code thereon for use by a processor, the program code comprising instructions for performing the methods or the computing blocks as described above.

In the following, two exemplary implementations for uplink retransmission memory as described above are illustrated. The first example implementation describes average memory fill saving. The second example implementation describes memory power reduction.

The average memory fill saving depends on the use-case. For example in a use-case for uplink video streaming (e.g. UHD video conference call in eMBB scenarios) 4K (2160p) video is assumed which requires a transmission bit rate around 40 Mbps (information bits after video compression but before channel encoding). Further, a typical PUSCH scheduling is considered for the video streaming case which is at every 20 ms (UL transmission for streaming applications is not back-to-back because a constant time gap is reserved for video CODEC processing). Then, the UL payload data (UL-SCH) size can be estimated in the following form:

$$\text{Estimated UL-SCH bits size per PUSCH} \approx 40*(1024)*(1024)/(1/0.02)\text{bit} \approx 800 \text{ Kbye}.$$

It means, in this scenario, without UL retransmission prediction according to the disclosure, 800 Kbyte of memory have to be constantly occupied within the UL HARQ buffer. That is because, due to asynchronous UL HARQ in 5G NR, the UL ACK/NACK flag associated to a previous PUSCH transmission is embedded within the next PUSCH grant, which is scheduled 20 ms later. As a result, such 800 Kbyte of UL-HARQ payload bits cannot be released by UE at all when doing UL video streaming. When using UL retransmission prediction according to this disclosure, when UE predicts good UL conditions, UE can immediately release the corresponding payload memory.

Regarding memory power reduction (second example implementation), the saved memory power is the leakage power due to the reduced on-duration of the memory banks which keep those UL-SCH bits for UL re-transmission. Following exemplary numbers can be applied: With 14 nm technology, for a DRAM bank of 64 Kbyte which is switched on, the leakage power is estimated to be about x mW (x depending on hardware). By taking the same use-case (UL video streaming) as from first example implementation, for every 20 ms time window (UL scheduling interval for video streaming), without this optimization, the memory leakage power for keeping such 800 Kbyte of UL-SCH bits is estimated as the following:

$$P\_leakage\_all = floor(800/64) * x$$

With this optimization, the memory banks for keeping such huge UL-SCH bits can be immediately switched off after the PUSCH transmission, therefore the equivalent memory leakage power within such 20 ms timing window is estimated as the following:

$$P\_leakage\_opt = floor(800/64) * x * 1/20$$

The saved memory leakage power by applying UL retransmission prediction according to this disclosure is the difference between the two above leakage powers that can be computed as:

$$P\_leakage\_save = P\_leakage\_all - P\_leakage\_opt$$

Furthermore, besides the above mentioned UL video streaming use-case, there is another use-case which can also be beneficial based on UL retransmission prediction according to the disclosure: That is in C-DRX (connected mode DRX) operation. Hereby, UE can be scheduled to transmit a PUSCH before C-DRX off-duration. Since UL HARQ in 5G NR is unsynchronized, UE has to keep the payload bits within the memory for the full C-DRX off-duration, and can only release such memory after having received the retransmission flag after UE is back to on-duration. Note that, the C-DRX off-duration can be quite long (up to 2.56 seconds). By UL retransmission prediction, UE can early release such memory.

Examples

The following examples pertain to further embodiments. Example 1 is a User Equipment, UE, circuitry, comprising: a Radio Frequency, RF, circuitry, configured to transmit uplink data; an uplink retransmission memory configured to store the transmitted uplink data for a later retransmission; and a baseband circuitry, configured to release the uplink retransmission memory based upon a predicted value of an uplink retransmission indicator before receiving the uplink retransmission indicator from a base station, wherein the uplink retransmission indicator indicates a successful transmission of the uplink data stored in the uplink retransmission memory.

In Example 2, the subject matter of Example 1 can optionally include that the uplink retransmission indicator is predicted based on statistics of previously received uplink retransmission indices.

In Example 3, the subject matter of Example 2 can optionally include that the statistics of previously received uplink retransmission indices are based on an uplink retransmission index which indicates a number of retransmissions of the same uplink data.

In Example 4, the subject matter of Example 1 or 2 can optionally include that the uplink retransmission indicator is predicted based on statistics of previously received uplink retransmission indices weighted by a modulation and coding scheme (MCS) of uplink data associated with the respective uplink retransmission indices.

In Example 5, the subject matter of Example 1 or 2 can optionally include that the uplink retransmission indicator is predicted based on gradient measurement for uplink transmission power changes determined for previously received uplink transmission power control (TPC) commands.

In Example 6, the subject matter of Example 5 can optionally include that the baseband circuitry is configured to release the uplink retransmission memory for a gradient measurement indicating a negative gradient and to maintain the uplink retransmission memory for a gradient measurement indicating a positive gradient.

In Example 7, the subject matter of Example 1 or 2 can optionally include that the uplink retransmission indicator is predicted based on downlink channel quality measurements for particular downlink reference signals that are indicated to be spatially associated to the transmitted uplink data.

In Example 8, the subject matter of Example 7 can optionally include that the baseband circuitry is configured to determine the downlink channel quality measurements based on at least one of the following: path-loss estimation, delay spread estimation or noise power estimation of the particular downlink reference signals.

In Example 9, the subject matter of Example 1 or 2 can optionally include that the baseband circuitry is configured to predict the uplink retransmission indicator by comparing between downlink acknowledge bits (DL ACK) carried by the uplink data transmission (PUSCH), and a later-on received downlink re-transmission which is violating the indicated downlink acknowledge bits.

In Example 10, the subject matter of Example 1 or 2 can optionally include that the baseband circuitry is configured to release the uplink retransmission memory based on a metric weighting at least one of the following information: statistics of previously received uplink retransmission indices, gradient information determined for previously received uplink transmission power control (TPC) commands, downlink channel quality measurements for particular downlink reference signals that are indicated to be spatially associated to the transmitted uplink data, and a downlink retransmission indicator indicating a successful transmission of downlink data.

In Example 11, the subject matter of Example 10 can optionally include that the baseband circuitry is configured to release the uplink retransmission memory when the metric is below a threshold and to maintain the uplink retransmission memory when the metric is above the threshold.

In Example 12, the subject matter of Example 11 can optionally include that the baseband circuitry is configured to adapt the threshold based on Quality of Service, QoS, requirements of higher layer applications.

In Example 13, the subject matter of Example 12 can optionally include that the baseband circuitry is configured to reduce the threshold for a QoS critical application if the QoS requirement is reduced.

In Example 14, the subject matter of Example 1 or 2 can optionally include that the baseband circuitry is configured to turn-off the prediction of the uplink retransmission indicator upon detecting a threshold number of wrong prediction results.

In Example 15, the subject matter of Example 14 can optionally include that the baseband circuitry is configured to determine a wrong prediction result based on a comparison between the uplink retransmission indicator predicted by the UE circuitry and the uplink retransmission indicator received later-on from a base station which is associated to the same transmitted uplink data.

In Example 16, the subject matter of Example 1 or 2 can optionally include that the uplink retransmission memory comprises a plurality of memory banks, wherein each memory bank is in an independent power domain and can be individually powered off if the stored uplink retransmission data is released within a memory bank.

In Example 17, the subject matter of Example 1 or 2 can optionally include that the baseband circuitry is configured to process a plurality of unsynchronized Hybrid Automatic Repeat Request (HARQ) processes according to 5G New Radio specification.

Example 18 is a processing circuit for a User Equipment, UE, wherein the UE comprises a radio frequency, RF, transmitter for transmitting uplink data and an uplink retransmission memory for storing the transmitted uplink data for a later retransmission, wherein the processing circuit is configured to: release the uplink retransmission memory based upon a predicted value of an uplink retransmission indicator before receiving the uplink retransmission indicator from a base station, the uplink retransmission indicator indicating a successful transmission of the uplink data stored in the uplink retransmission memory.

In Example 19, the subject matter of Example 18 can optionally include that the processing circuit is configured to release the uplink retransmission memory based on a metric weighting at least one of the following information: statistics of previously received uplink retransmission indices, gradient information determined for previously received uplink transmission power control (TPC) commands, downlink channel quality measurements for particular downlink reference signals that are indicated to be spatially associated to the transmitted uplink data, and a downlink retransmission indicator indicating a successful transmission of downlink data.

In Example 20, the subject matter of Example 19 can optionally include that the processing circuit is configured to release the uplink retransmission memory when the metric is below a threshold and to maintain the uplink retransmission memory when the metric is above the threshold.

Example 21 is a User Equipment, UE, comprising: a Radio Frequency, RF, circuit, configured to transmit a Physical Uplink Shared Channel (PUSCH); an uplink Hybrid Automatic Repeat Request, HARQ, memory bank configured to store the PUSCH transmission; and a baseband circuit, configured to release the uplink HARQ memory bank from the PUSCH transmission based upon a predicted value of a New Data Indicator, NDI, associated with the PUSCH transmission before receiving the NDI from a base station, the NDI indicating a successful transmission of the PUSCH stored in the HARQ memory bank.

In Example 22, the subject matter of Example 21 can optionally include that the baseband circuit is configured to release the uplink HARQ memory bank from the PUSCH transmission based on a metric weighting at least one of the following information: statistics of previously received uplink retransmission indices, gradient information determined for previously received uplink transmission power control (TPC) commands, downlink channel quality measurements for particular downlink reference signals that are indicated to be spatially associated to the PUSCH transmission, and Physical Downlink Shared Channel (PDSCH) acknowledge bits associated with the PUSCH transmission, the PDSCH acknowledge bits indicating a successful PDSCH transmission.

Example 23 is a method for unsynchronized uplink transmission, the method comprising: transmitting uplink data; storing the transmitted uplink data in an uplink retransmission memory for a later retransmission; and releasing the uplink retransmission memory based upon a predicted value of an uplink retransmission indicator before receiving the uplink retransmission indicator from a base station, the uplink retransmission indicator indicating a successful transmission of the uplink data stored in the uplink retransmission memory.

In Example 24, the subject matter of Example 23 can optionally include: predicting the uplink retransmission indicator based on statistics of previously received uplink retransmission indices.

In Example 25, the subject matter of Example 24 can optionally include: determining the statistics of previously received uplink retransmission indices based on an uplink retransmission index which indicates a number of retransmissions of the same uplink data.

In Example 26, the subject matter of Example 24 or 25 can optionally include: releasing the uplink retransmission memory based on a metric weighting at least one of the following information: statistics of previously received uplink retransmission indices, gradient information determined for previously received uplink transmission power control (TPC) commands, downlink channel quality measurements for particular downlink reference signals that are indicated to be spatially associated to the transmitted uplink data, and a downlink retransmission indicator indicating a successful transmission of downlink data.

Example 27 is a device for unsynchronized uplink transmission, the device comprising: means for transmitting uplink data; means for storing the transmitted uplink data in an uplink retransmission memory for a later retransmission; and means for releasing the uplink retransmission memory based upon a predicted value of an uplink retransmission indicator before receiving the uplink retransmission indicator from a base station, the uplink retransmission indicator indicating a successful transmission of the uplink data stored in the uplink retransmission memory.

In Example 28, the subject matter of Example 27 can optionally include means for predicting the uplink retransmission indicator based on statistics of previously received uplink retransmission indices which indicate a number of retransmissions of the same uplink data.

Example 29 is a system-on-chip, comprising: a Radio Frequency, RF, circuitry, configured to transmit uplink data; an uplink retransmission memory configured to store the transmitted uplink data for a later retransmission; and a baseband circuitry, configured to release the uplink retransmission memory based upon a predicted value of an uplink retransmission indicator before receiving the uplink retransmission indicator from a base station, the uplink retransmission indicator indicating a successful transmission of the uplink data stored in the uplink retransmission memory.

In Example 30, the subject matter of Example 29 can optionally include that the baseband circuitry is configured to predict the uplink retransmission indicator based on statistics of previously received uplink retransmission indices which indicate a number of retransmissions of the same uplink data.

Example 31 is a computer readable non-transitory medium on which computer instructions are stored which when executed by a computer cause the computer to perform the method of any one of Examples 23 to 26.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A User Equipment, UE, circuitry, comprising:
a Radio Frequency, RF, circuitry, configured to transmit uplink data;
an uplink retransmission memory configured to store the transmitted uplink data for a later retransmission; and
a baseband circuitry configured to release the uplink retransmission memory based upon a predicted value of an uplink retransmission indicator before receiving the uplink retransmission indicator from a base station, wherein the uplink retransmission indicator indicates a successful transmission of the uplink data stored in the uplink retransmission memory.

2. The UE circuitry of claim 1,
wherein the predicted value of the uplink retransmission indicator is predicted based on statistics of previously received uplink retransmission indices.

3. The UE circuitry of claim 2,
wherein the statistics of previously received uplink retransmission indices are based on an uplink retransmission index which indicates a number of retransmissions of the same uplink data.

4. The UE circuitry of claim 1,
wherein the uplink retransmission indicator is predicted based on statistics of previously received uplink retransmission indices weighted by a modulation and coding scheme (MCS) of uplink data associated with the respective uplink retransmission indices.

5. The UE circuitry of claim 1,
wherein the uplink retransmission indicator is predicted based on gradient measurement for uplink transmission power changes determined for previously received uplink transmission power control (TPC) commands.

6. The UE circuitry of claim 5,
wherein the baseband circuitry is configured to release the uplink retransmission memory for a gradient measurement indicating a negative gradient and to maintain the uplink retransmission memory for a gradient measurement indicating a positive gradient.

7. The UE circuitry of claim 1,
wherein the uplink retransmission indicator is predicted based on downlink channel quality measurements for particular downlink reference signals that are indicated to be spatially associated to the transmitted uplink data.

8. The UE circuitry of claim 7,
wherein the baseband circuitry is configured to determine the downlink channel quality measurements based on at least one of the following: path-loss estimation, delay spread estimation or noise power estimation of the particular downlink reference signals.

9. The UE circuitry of claim 1,
wherein the baseband circuitry is configured to predict the uplink retransmission indicator by comparing between downlink acknowledge bits (DL ACK) carried by the uplink data transmission (PUSCH), and a later-on received downlink re-transmission which is violating the indicated downlink acknowledge bits.

10. The UE circuitry of claim 1,
wherein the baseband circuitry is configured to release the uplink retransmission memory based on a metric weighting at least one of the following information:
statistics of previously received uplink retransmission indices,
gradient information determined for previously received uplink transmission power control (TPC) commands,
downlink channel quality measurements for particular downlink reference signals that are indicated to be spatially associated to the transmitted uplink data, and
a downlink retransmission indicator indicating a successful transmission of downlink data.

11. The UE circuitry of claim 10,
wherein the baseband circuitry is configured to release the uplink retransmission memory when the metric is below a threshold and to maintain the uplink retransmission memory when the metric is above the threshold.

12. The UE circuitry of claim 11,
wherein the baseband circuitry is configured to adapt the threshold based on Quality of Service, QoS, requirements of higher layer applications.

13. The UE circuitry of claim 12,
wherein the baseband circuitry is configured to reduce the threshold for a Quality of Service, QoS critical application if the QoS requirement is reduced.

14. The UE circuitry of claim 1,
wherein the baseband circuitry is configured to turn-off prediction of the uplink retransmission indicator upon detecting a threshold number of wrong prediction results.

15. The UE circuitry of claim 14,
wherein the baseband circuitry is configured to determine a wrong prediction result based on a comparison between the uplink retransmission indicator predicted by the UE circuitry and the uplink retransmission indicator received later-on from a base station which is associated to the same transmitted uplink data.

16. The UE circuitry of claim 1,
wherein the uplink retransmission memory comprises a plurality of memory banks, wherein each memory bank is in an independent power domain and can be individually powered off if the stored uplink retransmission data is released within a memory bank.

17. A processing circuit for a User Equipment, UE, wherein the UE comprises a radio frequency, RF, transmitter for transmitting uplink data and an uplink retransmission memory for storing the transmitted uplink data for a later retransmission, wherein the processing circuit is configured to:
release the uplink retransmission memory based upon a predicted value of an uplink retransmission indicator before receiving the uplink retransmission indicator from a base station, the uplink retransmission indicator indicating a successful transmission of the uplink data stored in the uplink retransmission memory.

18. The processing circuit of claim 17, wherein the processing circuit is configured to release the uplink retransmission memory based on a metric weighting at least one of the following information:

statistics of previously received uplink retransmission indices, gradient information determined for previously received uplink transmission power control (TPC) commands, downlink channel quality measurements for particular downlink reference signals that are indicated to be spatially associated to the transmitted uplink data, and a downlink retransmission indicator indicating a successful transmission of downlink data.

19. A User Equipment, UE, comprising:
a Radio Frequency, RF, circuit, configured to transmit a Physical Uplink Shared Channel (PUSCH);
an uplink Hybrid Automatic Repeat Request, HARQ, memory bank configured to store the PUSCH transmission; and
a baseband circuit, configured to release the uplink HARQ memory bank from the PUSCH transmission based upon a predicted value of a New Data Indicator, NDI, associated with the PUSCH transmission before receiving the NDI from a base station, the NDI indicating a successful transmission of the PUSCH stored in the HARQ memory bank.

20. The UE of claim 19, wherein the baseband circuit is configured to release the uplink HARQ memory bank from the PUSCH transmission based on a metric weighting at least one of the following information:

statistics of previously received uplink retransmission indices, gradient information determined for previously received uplink transmission power control (TPC) commands, downlink channel quality measurements for particular downlink reference signals that are indicated to be spatially associated to the PUSCH transmission, and Physical Downlink Shared Channel (PDSCH) acknowledge bits associated with the PUSCH transmission, the PDSCH acknowledge bits indicating a successful PDSCH transmission.

* * * * *